(12) United States Patent
Lawson et al.

(10) Patent No.: US 8,608,239 B1
(45) Date of Patent: Dec. 17, 2013

(54) PRECIPITATION MANAGEMENT SYSTEM FOR MOBILE EQUIPMENT

(75) Inventors: Andrew F. Lawson, Milwaukee, WI (US); Douglas F. Zahn, Waukesha, WI (US)

(73) Assignee: Caterpillar Global Mining LLC, South Milwaukee, WI (US)

( * ) Notice: Subject to any disclaimer, the term of this patent is extended or adjusted under 35 U.S.C. 154(b) by 0 days.

(21) Appl. No.: 13/607,524

(22) Filed: Sep. 7, 2012

(51) Int. Cl.
*B60N 99/00* (2006.01)

(52) U.S. Cl.
USPC ........................................................ 296/208

(58) Field of Classification Search
USPC ................................ 296/163, 208, 213; 52/11
See application file for complete search history.

(56) References Cited

U.S. PATENT DOCUMENTS

| | | | |
|---|---|---|---|
| 2,039,208 A | 4/1936 | Billman | |
| 2,544,580 A | 3/1951 | Blanchet | |
| 2,635,918 A | 4/1953 | Muckle | |
| 2,661,234 A * | 12/1953 | Bishop | 296/213 |
| 2,801,601 A * | 8/1957 | Riedel | 52/11 |
| 3,545,144 A * | 12/1970 | Sickler | 52/11 |
| 3,630,568 A | 12/1971 | Podwys | |
| 5,013,083 A | 5/1991 | Yada et al. | |
| 5,865,498 A | 2/1999 | Grogan | |
| 5,960,591 A * | 10/1999 | Schluter | 52/11 |
| 7,530,200 B2 * | 5/2009 | Gramling | 52/11 |
| 7,958,677 B2 * | 6/2011 | Gramling | 52/11 |

* cited by examiner

*Primary Examiner* — Lori Lyjak
(74) *Attorney, Agent, or Firm* — Foley & Lardner LLP

(57) ABSTRACT

A precipitation management system for mobile equipment with multiple modules is provided. The precipitation management system may include a water-resistant seal coupled to a first module, and a seal housing bracket coupled to a second module. The precipitation management system may also include a seal housing assembly configured to receive the water-resistant seal. The seal housing assembly may have two sides, a first side coupled to the first module, and a second side coupled to the seal housing bracket. The water-resistant seal may be disposed within the seal housing assembly, and the precipitation management system may be configured to deter liquid from entering the mobile equipment.

20 Claims, 4 Drawing Sheets

PRECIPITATION MANAGEMENT SYSTEM FOR MOBILE EQUIPMENT

TECHNICAL FIELD

This disclosure relates to a precipitation management system for large mobile equipment, and particularly to a system for diverting rain water from large mobile equipment with multiple modules, such as mining equipment.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Large mobile equipment can have two or more housing modules, such as for enclosing various components or portions of the mobile equipment. Due to assembly tolerances and varying module roof lines, there are typically spaces between the modules. These spaces can form large gaps, where rain water may enter the equipment. The rain water may tend to leak down into the machine, causing corrosion to the equipment components and making it difficult for mechanics or other technicians to service the equipment.

Conventional precipitation management devices have been used to prevent rain water from leaking into the equipment. However, these conventional precipitation management devices present certain challenges. For example, conventional devices are typically very rigid. The devices are often one piece, and made from an inflexible material. The rigid conventional devices usually do not allow for relative movement between the modules. Conventional devices are also not easily removable. They typically utilize rain gutters that are often bolted on or otherwise securely attached to the equipment, making it difficult to remove a part of the device for replacement or repair. In order to remove a roof panel or service a single module, conventional precipitation management devices must often be completely removed and tools are required to remove the devices, leading to increased maintenance time, expense, and inconvenience.

Another problem with conventional precipitation management devices is that they often create a tripping hazard. Operators aboard the mobile equipment often utilize the module roof as a deck, typically walking from one module roof to another module roof. Some conventional precipitation management devices utilize a roof gap covering, which may protrude from the roof gap, creating a tripping hazard for the equipment operators. Increasing safety requirements may also prevent the installation and use of conventional precipitation management devices in large mobile equipment.

SUMMARY OF THE INVENTION

An embodiment of the present disclosure relates to a precipitation management system for mobile equipment with multiple modules. The precipitation management system includes a water-resistant seal coupled to at least a first module, and at least one seal housing bracket coupled to at least a second module. The precipitation management system also includes at least one seal housing assembly configured to receive the water-resistant seal, the seal housing assembly having two sides, a first side coupled to the first module and a second side coupled to the seal housing bracket.

In this embodiment, the seal housing assembly includes at least two hanger brackets, at least one hanger bracket coupled to the seal housing bracket, and at least one hanger bracket coupled to the first module. The seal housing assembly also includes a seal housing configured to receive the water-resistant seal, the seal housing having two sides, each side coupled to at least one hanger bracket. The seal housing assembly further includes locking hardware configured to couple the seal housing to the hanger brackets.

In this embodiment, the water-resistant seal is disposed within the seal housing assembly, in this embodiment. Further, the precipitation management system is configured to deter liquid from entering the mobile equipment.

Another embodiment of the present disclosure relates to a gutter assembly for a precipitation management system. The gutter assembly includes a water-resistant seal, and a seal housing assembly configured to receive the water-resistant seal. The seal housing assembly includes a first hanger bracket, a second hanger bracket, and a seal housing configured to receive the water-resistant seal. The seal housing has two sides, a first side coupled to the first hanger bracket, and a second side coupled to the second hanger bracket. The water-resistant seal is disposed within the seal housing assembly, and the gutter assembly is configured to deter liquid.

Another embodiment of the present disclosure relates to a method for providing a precipitation management system for mobile equipment with multiple modules. The method includes providing a water-resistant seal coupled to at least a first module. The method also includes providing at least one seal housing bracket coupled to at least a second module. The method further includes providing at least one seal housing assembly configured to receive the water-resistant seal, the seal housing assembly having two sides, a first side coupled to the first module and a second side coupled to the seal housing bracket.

In this embodiment, the seal housing assembly includes at least two hanger brackets, at least one hanger bracket coupled to the seal housing bracket, and at least one hanger bracket coupled to the first module. The seal housing assembly also includes a seal housing configured to receive the water-resistant seal, the seal housing having two sides, each side coupled to at least one hanger bracket. The seal housing assembly further includes locking hardware configured to couple the seal housing to the hanger brackets.

In this embodiment, the water-resistant seal is disposed within the seal housing assembly, and the precipitation management system deters liquid from entering the mobile equipment.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
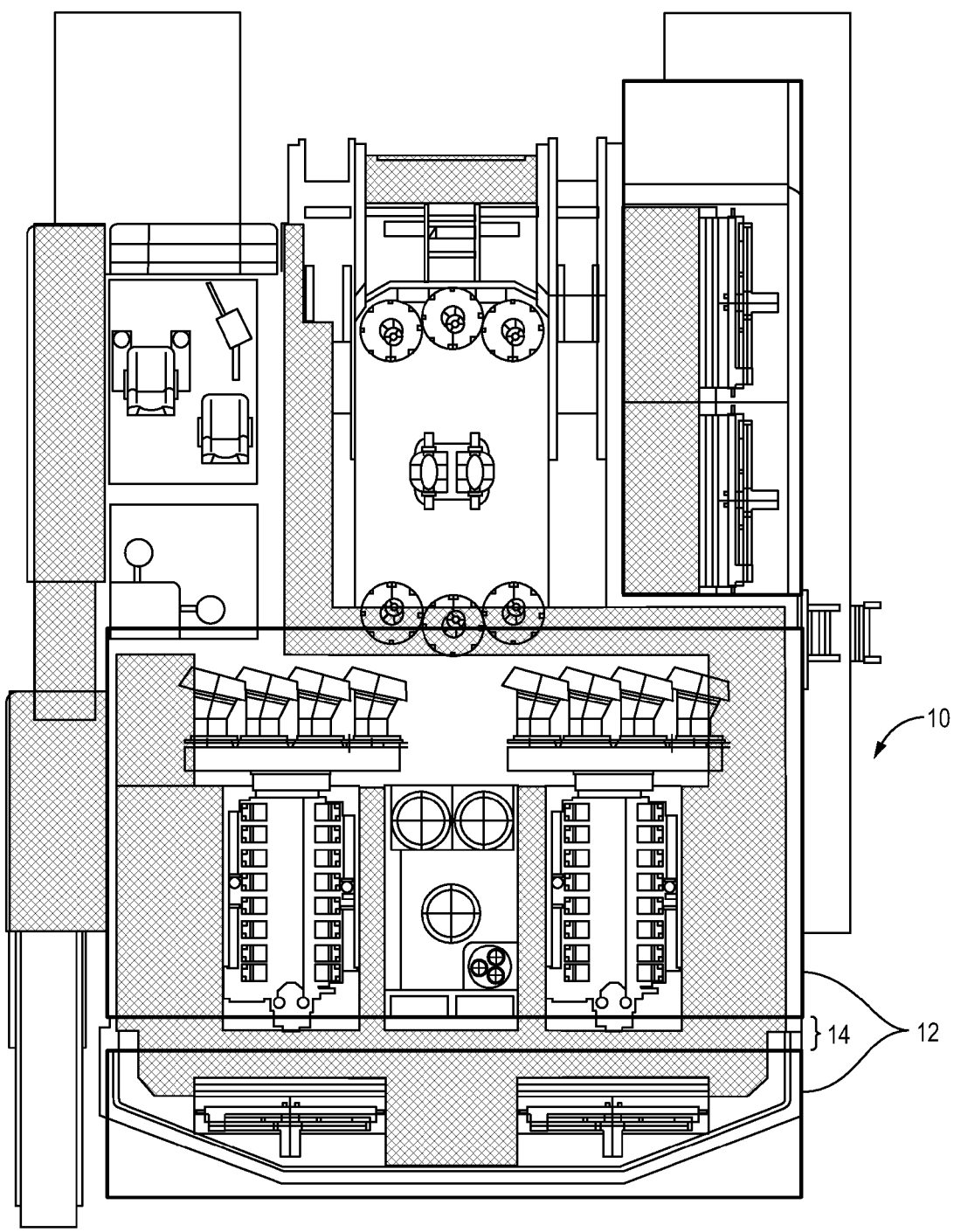
FIG. 1 is an overhead view of the deck of large mobile equipment, shown by way of example as a hydraulic mining shovel, according to an exemplary embodiment.

Referring to FIG. 1, an overhead view of large mobile equipment, shown by way of example as a generic hydraulic mining shovel, is shown. The dark boxes represent roof sections 12 on the mining shovel deck area 10. Equipment operators often use the deck area 10 around the perimeter of the roof sections 12 as a walking path. The operators are able to walk the length of the deck area 10, even between roof sections 12.

Between each of the roof sections 12 is a roof gap 14. Large equipment with multiple modules, such as the mining shovel shown in FIG. 1, often have these gaps 14 between the modules because the equipment components have large assembly tolerances. The gaps 14 have been exaggerated in FIG. 1 in order to more clearly show the problem areas. Through these gaps 14, rain water and other debris can fall down into the machinery and onto the mining personnel. For instance, mechanics and other technicians typically perform equipment repairs in areas underneath the roof gaps 14. Falling rain water can leak down onto the mechanics or technicians and onto the machinery being serviced, making it difficult for the mechanics or technicians to properly service the equipment, and potentially damaging the equipment Referring now to FIG. 2, an isolated view of a hydraulic module 20 is shown. An exemplary embodiment of a precipitation management system 22 is shown attached to the hydraulic module 20 for managing precipitation that may tend to infiltrate the gaps 14. Typically, the precipitation management system 22 would be connected on its other side to a second module, but the second module has been removed in order to more clearly show the location of the precipitation management system 22 on the hydraulic module 20, so that precipitation is managed along the entire gap 14. In this embodiment, the precipitation management system 22 extends along the entire edge of the hydraulic module 20. The precipitation management system 22 is connected underneath the roof of the hydraulic module 20 and is intended to be continuous, having no gaps for rain water to leak through.

Figure 2:
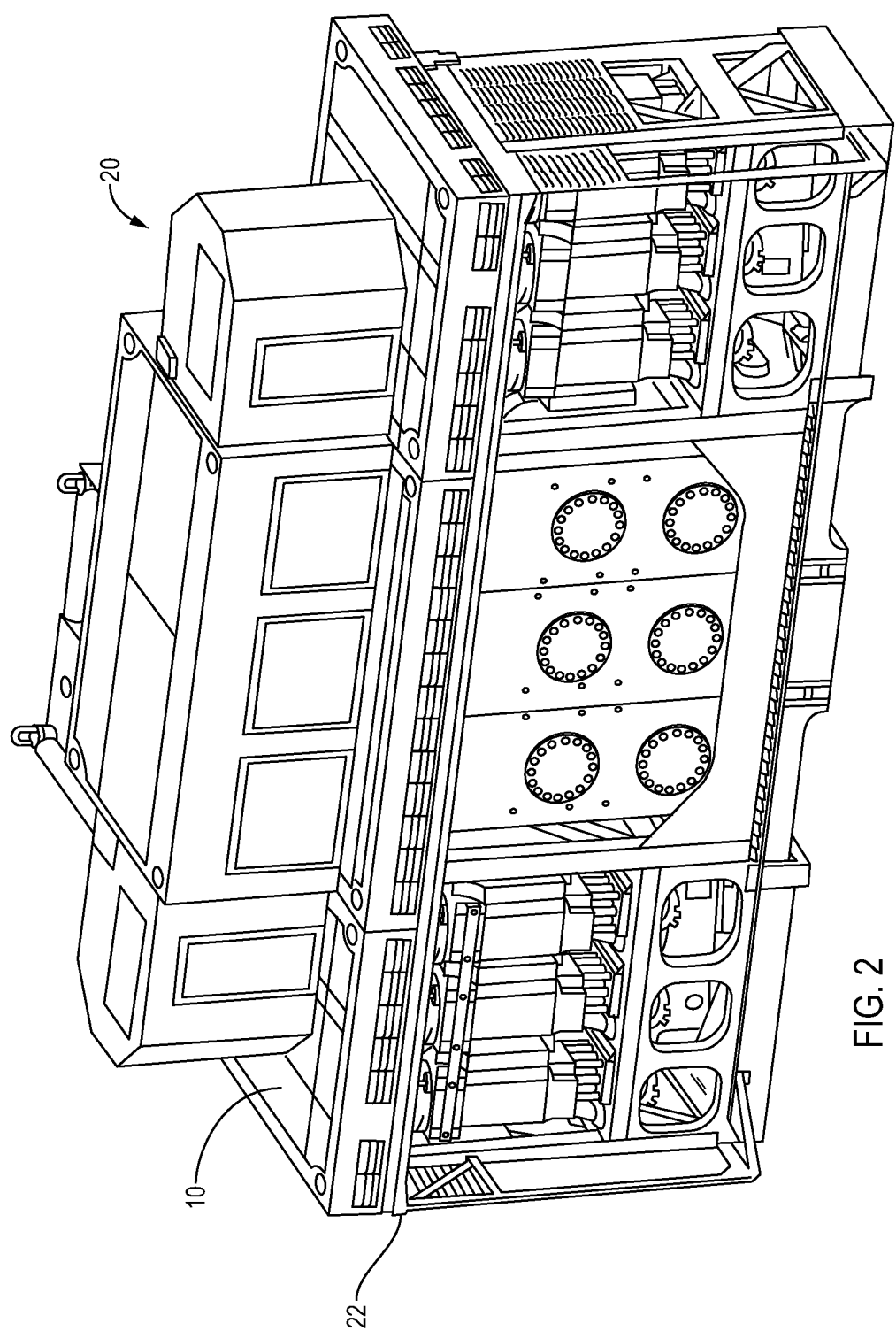
FIG. 2 is an isometric view of a hydraulic module of the large mobile equipment, according to an exemplary embodiment.

Also shown in FIG. 2 is a view of the deck area 10 of the hydraulic module 20. Equipment operators and other mining personnel are able to traverse the roof of the mobile equipment by utilizing the deck area 10. Conventional precipitation management devices utilizing a roof gap covering often extend above the deck area 10 of the module 20, creating a tripping or other safety hazard for personnel on the deck area 10. As FIG. 2 shows, the precipitation management system 22 is intended to be installed completely below the surface of the module 20. By eliminating any protrusions above the deck area 10, the precipitation management system 22 of the present disclosure may eliminate the tripping hazard created by conventional precipitation management devices.

Figure 3:
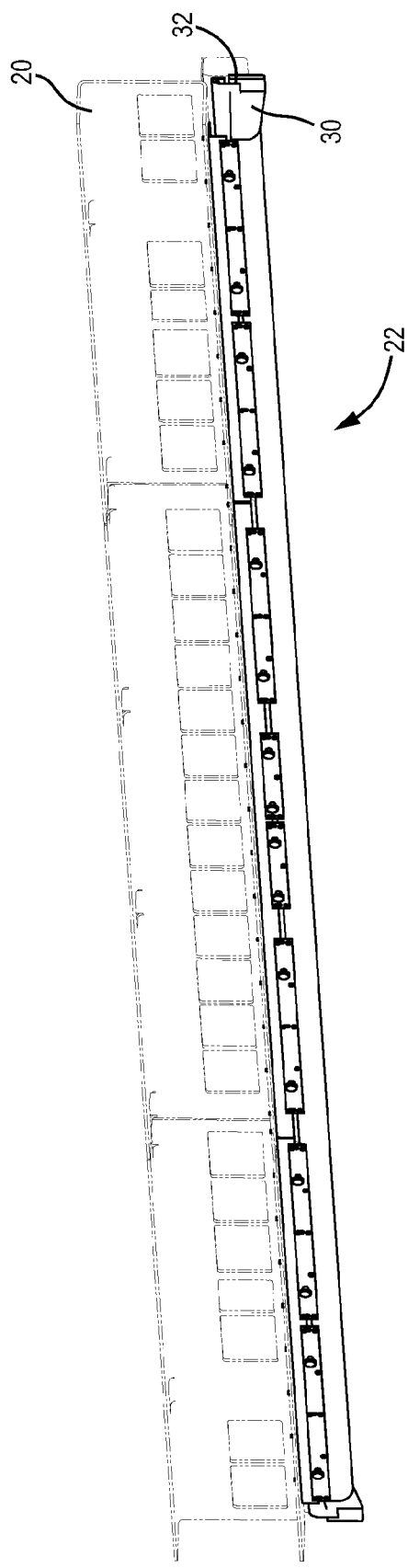
FIG. 3 is an isometric front view of the precipitation management system attached to a hydraulic module, according to an exemplary embodiment.

Referring now to FIG. 3, the precipitation management system 22 is shown in further detail, according to an exemplary embodiment. The precipitation management system 22 includes a seal housing assembly 30. The seal housing assembly 30 has two sides, with each side extending along the length of the module to which it attaches, in order to bridge the gap. A first side of the seal housing assembly 30 attaches to a first module, and a second side of the seal housing assembly 30 attaches to a second module. In this embodiment, the seal housing assembly 30 attaches to the hydraulic module 20 on one side and to a power module (not shown in FIG. 3) on the other side. However, the seal housing assembly 30 can be attached to any two modules on large mobile equipment to cover gaps between such modules. The seal housing assembly 30 is shown in further detail in FIG. 4.

When installed, the seal housing assembly 30 is intended to create a channel, and a water-resistant seal 32 is tucked into this channel. The water-resistant seal 32 has two sides that each extend the length of the module to which it attaches. Like the seal housing assembly 30, a first side of the water-resistant seal 32 attaches to a first module, and a second side of the water-resistant seal 32 attaches to a second module. In the exemplary embodiment of FIG. 3, the water-resistant seal 32 attaches to the hydraulic module 20 on one side and a power module (not shown) on the other side. Details of the water-resistant seal 32 attachment are shown more particularly in FIG. 5.

The water-resistant seal 32 acts as a gutter in conjunction with the seal housing assembly 30, channeling the water that enters the gap 14 away from the equipment. In exemplary embodiments, the water-resistant seal 32 is formed as a single piece, creating a continuous layer of protection against rain water intrusion. In this embodiment, the water-resistant seal 32 is flexible, allowing for relative movement between modules (e.g., during operation of the equipment, etc.). The water-resistant seal 32 collapses and expands, depending on the size of the roof gap 14 between modules and relevant movement of the modules relative to one another. In other exemplary embodiments, the water-resistant seal 32 is made from neoprene or another synthetic rubber with similar water-resistant properties and durability.

Figure 4:
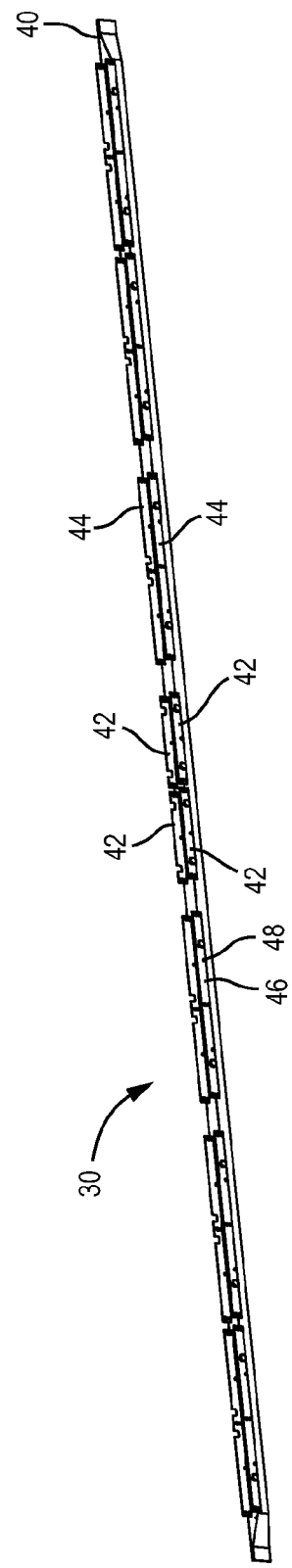
FIG. 4 is a front view of the seal housing assembly, according to an exemplary embodiment.

Referring now to FIG. 4, an isolated view of the seal housing assembly 30 is shown. The seal housing assembly 30 includes a seal housing 40 that extends along the length of the module 20. In an exemplary embodiment, the seal housing 40 has a V-shaped trench configured to cradle the water-resistant seal 32. However, the seal housing 40 can be of another shape more suitable to fit between two particular modules or to hold the particular water-resistant seal 32. The seal housing 40 is made from a flexible material to allow for relative movement between the modules, and to collapse and expand depending on the gap 14 between modules.

The seal housing 40 is coupled to a number of support members, shown as short hanger brackets 42 and long hanger brackets 44. In an exemplary embodiment, the seal housing 40 is coupled to four short hanger brackets 42 and twelve long hanger brackets 44 by button screws 46 and washers 48, as shown in FIG. 4. However, the hanger brackets 42 and 44 can be coupled to the seal housing 40 by any suitable method of attachment for the intended application. Also, the number of hanger brackets 42 and 44 used in the seal housing assembly 30 is dependent on the size of the modules and the size of the particular hanger brackets. The hanger brackets 42 and 44 are configured to attach to both sides of the seal housing 40.

The hanger brackets 42 and 44 and the seal housing 40 provide support for, and create a channel for the water-resistant seal 32 to rest within. The hanger brackets 42 and 44 are shown to have notches 45 for attaching the assembly 30 to the hydraulic module 20 and to the power module (not shown in FIG. 4). Details of this attachment are more particularly shown in FIG. 5.

Figure 5:
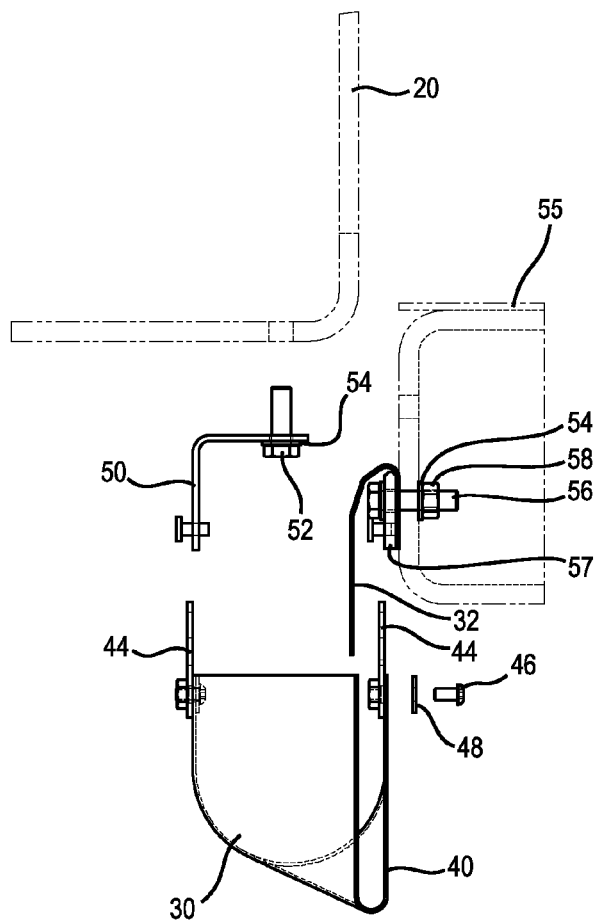
FIG. 5 is an exploded view of the precipitation management system and its components, according to an exemplary embodiment.

Referring now to FIG. 5, an exploded side view of the precipitation management system 22 and related modules is shown according to an exemplary embodiment. The water-resistant seal 32 is attached to a module. In this exemplary embodiment, the water-resistant seal 32 is attached to the power module 55 by a screw assembly, including screws 56, washers 54, and nuts 58, and an attachment bracket 57. In this embodiment, the water-resistant seal 32 is firmly attached to the module 55, so that tools are required to remove the water-resistant seal 32. However, the water-resistant seal 32 can be attached to the module by any suitable method of attachment for the particular application.

The seal housing assembly 30 attaches to the same module as the water-resistant seal 32. According to one embodiment where the structure of the modules includes connectors, such as bolts, weldments, rivets, etc., the seal housing assembly 30 is attached by sliding the notches 45 on the hanger brackets 42 and 44 over the welded rivets 51 on the module. In the exemplary embodiment of FIG. 5, the seal housing assembly 30 is attached to the power module 55. The seal housing assembly 30 can be attached and removed from the module 55 by sliding the hanger brackets 42 and 44 on or off the rivets 51. The water-resistant seal 32 is more permanently attached to the module 55, hanging down when the seal housing assembly 30 is removed.

Referring further to FIG. 5, seal housing brackets 50 are shown attached to the hydraulic module 20 by a screw 52 and a washer 54. In the exemplary embodiment of FIG. 5, the seal housing brackets 50 are shown to have two ends that are perpendicular to each other, forming a substantially right angle. A first end is attached to the bottom of the roof of the hydraulic module 20. A second end juts out substantially perpendicular from the hydraulic module 20, and has a welded rivet 51 that is configured to connect to the hanger brackets 42 and 44 of the seal housing assembly 30. In this embodiment, seal housing brackets 50 forming approximate right angles are utilized because the roof of the hydraulic module 20 is positioned above the roof of the power module 55, and the underside of the roof of the hydraulic module 20 must be used as an attachment point. However, other types of brackets of different shapes and sizes may be used in other embodiments to fit the particular application.

The second side of the seal housing assembly 30 attaches to the seal housing brackets 50 by sliding the notches 45 on the hanger brackets 42 and 44 over the welded rivets 51 on the seal housing brackets 50. The water-resistant seal 32 is then tucked into a channel formed by the seal housing assembly 30, and in between the power module 55 and the hydraulic module 20.

Once attached to the modules 20 and 55, the precipitation management system 22 is a flexible unit, capable of conforming to different sized gaps. The water-resistant seal 32 and seal housing 40 are both flexible, and are intended to compose a more effective seal than a rigid rain gutter system. The precipitation management system 22 may also be at least partially removed without disassembling the entire system 22. The seal housing assembly 30 is made up of a number of hanger brackets 42 and 44. When a particular module is removed or serviced, mechanics or other personnel may be able to remove sections of the seal housing assembly 30 without disassembling the entire precipitation management system 22. The water-resistant seal 32 hangs down while the module is serviced, and is then tucked back into the seal housing assembly 30 when the module is replaced.

Figure 6:
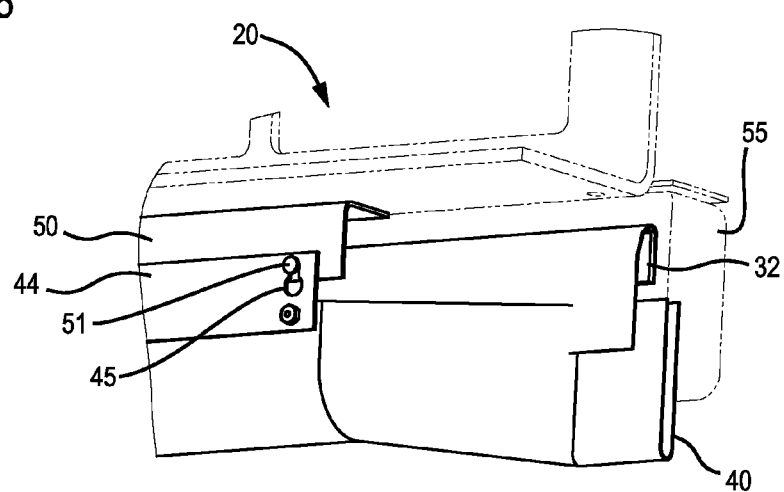
FIG. 6 is an isometric view of an end portion of the precipitation management system, according to an exemplary embodiment.

Referring now to FIG. 6, an isometric view of the end of the precipitation management system 22 is shown as installed. The seal housing assembly 30 is attached to the seal housing brackets 50 by sliding the notches 45 on the hanger brackets 44 over the rivets 51 on the seal housing brackets 50. The water-resistant seal 32 and the seal housing 40 are formed as flexible pieces, conforming to a desired fit between the hydraulic module 20 and the power module 55. In exemplary embodiments, the precipitation management system 22 is intended to minimize or prevent rain water from leaking down into the machinery, and then divert the rain water away from the equipment.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that the orientation of various elements may differ according to other exemplary embodiments, and that such variations are intended to be encompassed by the present disclosure.

It is also important to note that the construction and arrangement of the systems and methods for providing the precipitation management system as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions.

INDUSTRIAL APPLICABILITY

The disclosed precipitation management system may be utilized in any large mobile equipment with multiple modules, including but not limited to mining equipment such as large hydraulic shovels and the like. The disclosed precipitation management system is intended to help reduce the amount of precipitation that leaks into the equipment through gaps between the modules and to divert the precipitation away from the equipment.

Federal regulations require that roof areas on large mobile equipment with multiple modules be clear of tripping hazards. Conventional precipitation management devices utilizing roof gap coverings may project upwardly above the surface of the equipment. However, the precipitation management system 22 of the present disclosure is intended to be entirely disposed below a plane parallel to the roof of the module on the equipment. In one embodiment, seal housing brackets 50 forming right angles are attached below the surface of the module 20, so that the seal housing assembly 30 can be hung by its hanger brackets 42 and 44 completely below the surface of the modules 20 and 55.

The disclosed precipitation management system 22 may also be more easily removable than conventional precipitation management devices, in order to enhance serviceability. The seal housing assembly 30 is made up of a number of hanger brackets 42 and 44. When a particular module is removed or serviced, mechanics or other personnel may be able to remove sections of the seal housing assembly 30 without disassembling the entire precipitation management system 22. The water-resistant seal 32 hangs down while the module is serviced, and is then tucked back into the seal housing assembly 30 when the module is replaced.

Further, the disclosed precipitation management system 22 may be more flexible than conventional devices, allowing for relative movement between two modules without adversely affecting the performance of the seal and its capability to minimize or prevent water intrusion. The water-resistant seal 32 and the seal housing 40 are both made from flexible material in exemplary embodiments, conforming to a desired fit that seals the gap between two modules.

It will be apparent to those skilled in the art that various modifications and variations can be made to the disclosed precipitation management system. Other embodiments will be apparent to those skilled in the art from consideration of the specification and practice of the disclosed precipitation management system. It is intended that the specification and examples be considered as exemplary only, with a true scope being indicated by the following claims and their equivalents.

What is claimed is:

1. A precipitation management system for mobile equipment with multiple modules, comprising:
    a water-resistant seal coupled to at least a first module;
    at least one seal housing bracket coupled to at least a second module;
    at least one seal housing assembly configured to receive the water-resistant seal, the seal housing assembly having two sides, a first side coupled to the first module and a second side coupled to the seal housing bracket, the seal housing assembly comprising:
        at least two hanger brackets, at least one hanger bracket coupled to the seal housing bracket, and at least one hanger bracket coupled to the first module;
        a seal housing configured to receive the water-resistant seal, the seal housing having two sides, each side coupled to at least one hanger bracket; and
        locking hardware configured to couple the seal housing to the hanger brackets;
    wherein the water-resistant seal is disposed within the seal housing assembly; and
    wherein the precipitation management system is configured to deter liquid from entering the mobile equipment.

2. The precipitation management system of claim 1, wherein the seal housing bracket has two ends forming a right angle, a first end coupled to the second module, and a second end coupled to the seal housing assembly.

3. The precipitation management system of claim 1, wherein the water-resistant seal is made from a flexible material.

4. The precipitation management system of claim 3, wherein the water-resistant seal is made from neoprene.

5. The precipitation management system of claim 1, wherein the water-resistant seal is a single piece.

6. The precipitation management system of claim 1, wherein the seal housing bracket further comprises a seal housing bracket rivet, at least one hanger bracket notch configured to attach to the seal housing bracket rivet, coupling at least one hanger bracket to the seal housing bracket.

7. The precipitation management system of claim 1, further comprising a first module rivet, at least one hanger bracket notch configured to attach to the first module rivet, coupling at least one hanger bracket to the first module.

8. The precipitation management system of claim 1, wherein the precipitation management system is configured to divert liquid away to a location outside of the mobile equipment.

9. The precipitation management system of claim 1, wherein the locking hardware comprises a screw and a washer.

10. The precipitation management system of claim 1, further comprising a screw assembly for coupling the water-resistant seal to the first module, the screw assembly including a screw, a washer, and a nut.

11. The precipitation management system of claim 1, wherein the precipitation management system is entirely disposed below a plane substantially parallel to the roof of the first module, and below a plane substantially parallel to the roof of the second module.

12. The precipitation management system of claim 1, wherein the seal housing is made from a flexible material, the seal housing being configured to move relative to the movement of the first module and the second module.

13. The precipitation management system of claim 12, wherein the seal housing is configured to collapse and expand.

14. A gutter assembly for a precipitation management system, comprising:
    a water-resistant seal;
    a seal housing assembly configured to receive the water-resistant seal, the seal housing assembly comprising:
        a first hanger bracket;
        a second hanger bracket;
        a seal housing configured to receive the water-resistant seal, the seal housing having two sides, a first side coupled to the first hanger bracket, a second side coupled to the second hanger bracket; and wherein the water-resistant seal is disposed within the seal housing assembly, and the gutter assembly is configured to deter liquid.

15. The gutter assembly of claim 14, wherein the water-resistant seal is made from a flexible material.

16. The gutter assembly of claim 15, wherein the water-resistant seal is made from neoprene.

17. The gutter assembly of claim 14, wherein the water-resistant seal is a single piece.

18. The gutter assembly of claim 14, wherein the seal housing is made from a flexible material, the seal housing being configured to collapse and expand.

19. A method for providing a precipitation management system for mobile equipment with multiple modules, comprising:
   providing a water-resistant seal coupled to at least a first module;
   providing at least one seal housing bracket coupled to at least a second module;
   providing at least one seal housing assembly configured to receive the water-resistant seal, the seal housing assembly having two sides, a first side coupled to the first module and a second side coupled to the seal housing bracket, the seal housing assembly comprising:
      at least two hanger brackets, at least one hanger bracket coupled to the seal housing bracket, and at least one hanger bracket coupled to the first module;
      a seal housing configured to receive the water-resistant seal, the seal housing having two sides, each side coupled to at least one hanger bracket; and
      locking hardware configured to couple the seal housing to the hanger brackets;
   wherein the water-resistant seal is disposed within the seal housing assembly; and
   wherein the precipitation management system deters liquid from entering the mobile equipment.

20. The method of claim 19, wherein the precipitation management system is entirely disposed below a plane substantially parallel to the roof of the first module, and below a plane substantially parallel to the roof of the second module.

* * * * *